(12) United States Patent
Bornholdt

(10) Patent No.: US 7,468,696 B2
(45) Date of Patent: Dec. 23, 2008

(54) METHOD AND DEVICE FOR TRILATERATION USING LOS LINK PREDICTION AND PRE-MEASUREMENT LOS PATH FILTERING

(75) Inventor: James M. Bornholdt, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/610,570

(22) Filed: Dec. 14, 2006

(65) Prior Publication Data

US 2008/0143603 A1    Jun. 19, 2008

(51) Int. Cl.
*G01S 1/24* (2006.01)
*H04B 17/00* (2006.01)

(52) U.S. Cl. .................................. 342/387; 455/67.16

(58) Field of Classification Search ................................ 342/357.01–357.17, 387; 455/67.16
See application file for complete search history.

(56) References Cited

U.S. PATENT DOCUMENTS 7,221,913 B2 * 5/2007 Golden et al. ............ 455/67.16
2004/0130285 A1 * 7/2004 Le Gallo .................... 318/466

* cited by examiner

*Primary Examiner*—Thomas H Tarcza
*Assistant Examiner*—Harry Liu
(74) *Attorney, Agent, or Firm*—Charles L. Moore; Moore & Van Allen, PLLC

(57) ABSTRACT

A method for trilateration may include receiving a signal via each of a plurality of LOS paths and predicting performance of each LOS path. The method may also include filtering out signals received via LOS paths with performance below a predetermined threshold value. The method may further include performing trilateration using unfiltered signals to substantially determine a location of a device.

34 Claims, 7 Drawing Sheets

METHOD AND DEVICE FOR TRILATERATION USING LOS LINK PREDICTION AND PRE-MEASUREMENT LOS PATH FILTERING

BACKGROUND OF THE INVENTION

The present invention relates to navigation and determining a location of a device, such as a communications device or the like, and more particularly to a method and device for trilateration using line of sight (LOS) link prediction and pre-measurement LOS path filtering to estimate or predict the location of a device or receiver.

Radio navigation techniques based on trilateration assume that the first signal to arrive at a receiver travels via the direct, Line of Sight (LOS) path from a transmitter or transmitting device to the receiver or receiving device. A navigation system may mistake a signal from a non Line of Sight (NLOS) path as the LOS signal if the LOS signal is attenuated by any attenuating objects in the LOS path such that it is not detectable at the receiver. Because the path length of a NLOS signal is greater than the LOS path length, the range estimate from a NLOS measurement will be in error by a positive amount. The cumulative effect from using multiple NLOS signals in a range estimate also results in a positive bias because all range measurements from NLOS signals are larger than the range measurements from LOS signals. Existing methods and devices initially assume that all LOS signals are detectable and measure ranges based on this assumption. Existing method and devices try to filter out NLOS signals after the measurement but such post-measurement filtering may result in an increased probability of error because NLOS ranging errors have already been introduced into the position estimate and because of a lack of information about performance of the paths and use of such information in the filtering process.

BRIEF SUMMARY OF THE INVENTION

In accordance with an embodiment of the present invention, a method for trilateration may include receiving a signal via each of a plurality of LOS paths and predicting performance of each LOS path. The method may also include filtering out signals received via LOS paths with performance below a predetermined threshold value. The method may further include performing trilateration using unfiltered signals to substantially determine a location of a device.

In accordance with another embodiment of the present invention, a method for trilateration may include predicting a radio link performance for each radio link between a receiver and each of a plurality of transmitters. The method may also include selecting radio links for range measurements that have the best predicted performance relative to other radio links. The method may further include determining the receiver's location using the selected radio links for range measurements.

In accordance with another embodiment of the present invention, a device for trilateration may include a receiver to receive a signal from each of a plurality of transmitters over a respective radio path. The device may also include a module to predict performance of each radio path. A filtering device may be provided to filter out signals received via radio paths with a corresponding performance below a predetermined threshold value. The device may additionally include a module to determine a location of the receiver using unfiltered signals. An output device may be included to present the location of the receiver or a device associated with the receiver.

In accordance with another embodiment of the present invention, a device for trilateration may include means for predicting a radio link performance for each radio link between a receiver and each of a plurality of transmitters. Means may be provided for selecting radio links for range measurements that have the best predicted performance relative to other radio links. The device may also include means for determining the receiver's location using the selected radio links for range measurements.

In accordance with another embodiment of the present invention, a computer program product for trilateration may include a computer usable medium having computer usable program code embodied therein. The computer usable medium may include computer usable program code configured to predict a radio link performance for each radio link between a receiver and each of a plurality of transmitters. The computer useable medium may also include computer usable program code configured to select radio links for range measurements that have the best predicted performance relative to other radio links. The computer useable medium may also include computer usable program code configured to determine the receiver's location using the selected radio links for range measurements.

In accordance with a further embodiment of the present invention, a vehicle may include a device for locating the vehicle. The device may include means for predicting a radio link performance for each radio link between a receiver and each of a plurality of transmitters and means for selecting radio links for range measurements that have the best predicted performance relative to other radio links. The device may further include means for determining the vehicle's location using the selected radio links for range measurements.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
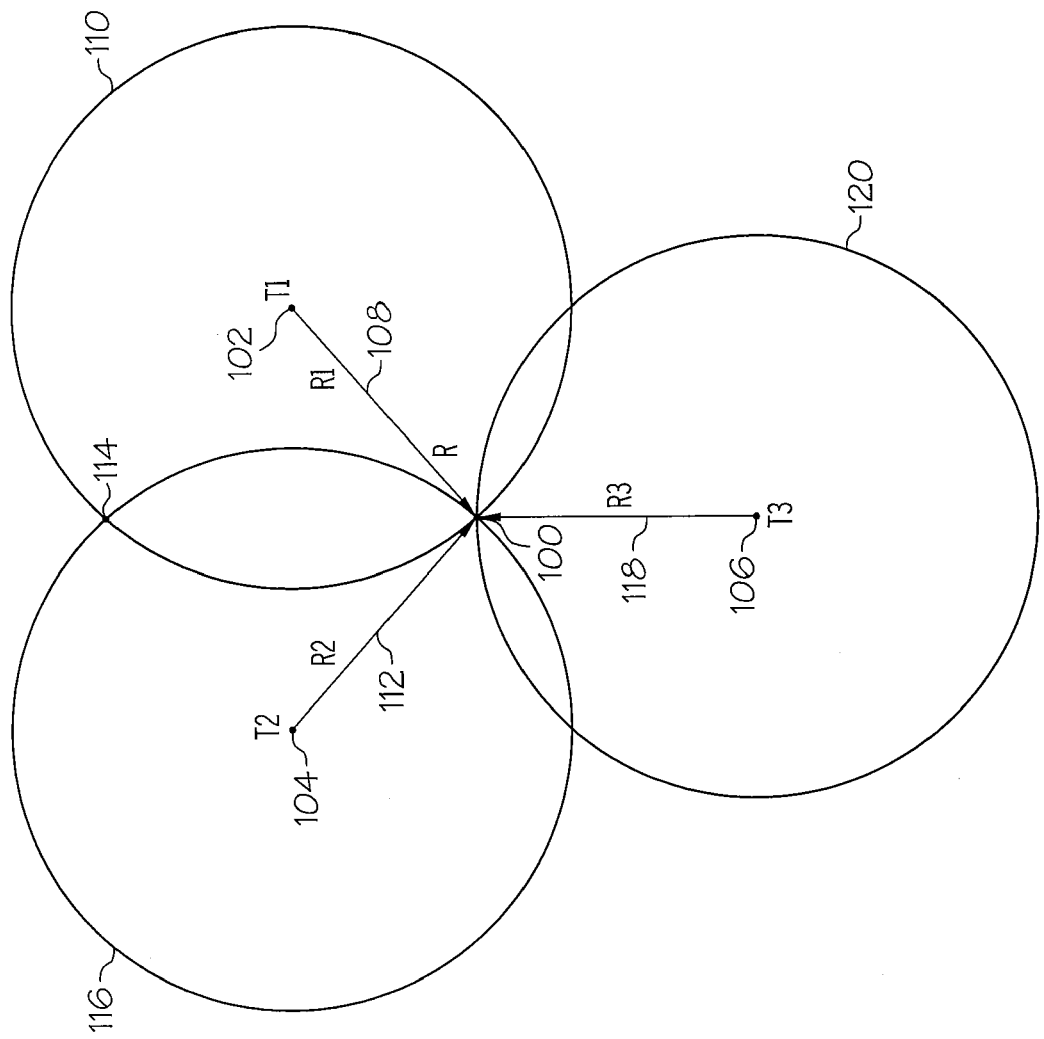
FIG. 1 is an example of determining a location of a device or receiver using trilateration.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is an example of determining a location of a device or receiver 100 using trilateration. Trilateration is a technique of determining the relative positions of objects, such as communications devices, radio frequency (RF) or wave scattering objects, RF attenuating objects or other objects or devices, using the geometry of triangles in a similar fashion to triangulation. Unlike triangulation, which uses angle measurements (together with at least one known distance) to calculate an objects location, trilateration uses the known location of two or more reference points or objects, and the measured distance between the object or device being located and each reference point or object. To accurately and uniquely determine the relative location of a point or object on a two-dimensional plane using trilateration alone, generally at least three reference points are needed.

In the example of FIG. 1, the location of receiver 100 may be desired relative to transmitters T1 102, T2 104, and T3 106. Measuring a range R1 108 for T1 102 narrows the location of R 100 to a circle 110 centered at T1 102. Measuring a range R2 112 for T2 102 narrows the possible locations of R 100 to two possible points, R 100 and point 114 corresponding to the intersections of circle 110 and circle 116 centered at T2 104. Measuring a range measurement R3 118 for T3 106 will provide the accurate location of the receiver R 100 as the intersection of the circles 110, 116 and 120 with the transmitter T3 106 at the center. A fourth reference point could be measured to reduce any errors.

Figure 2:
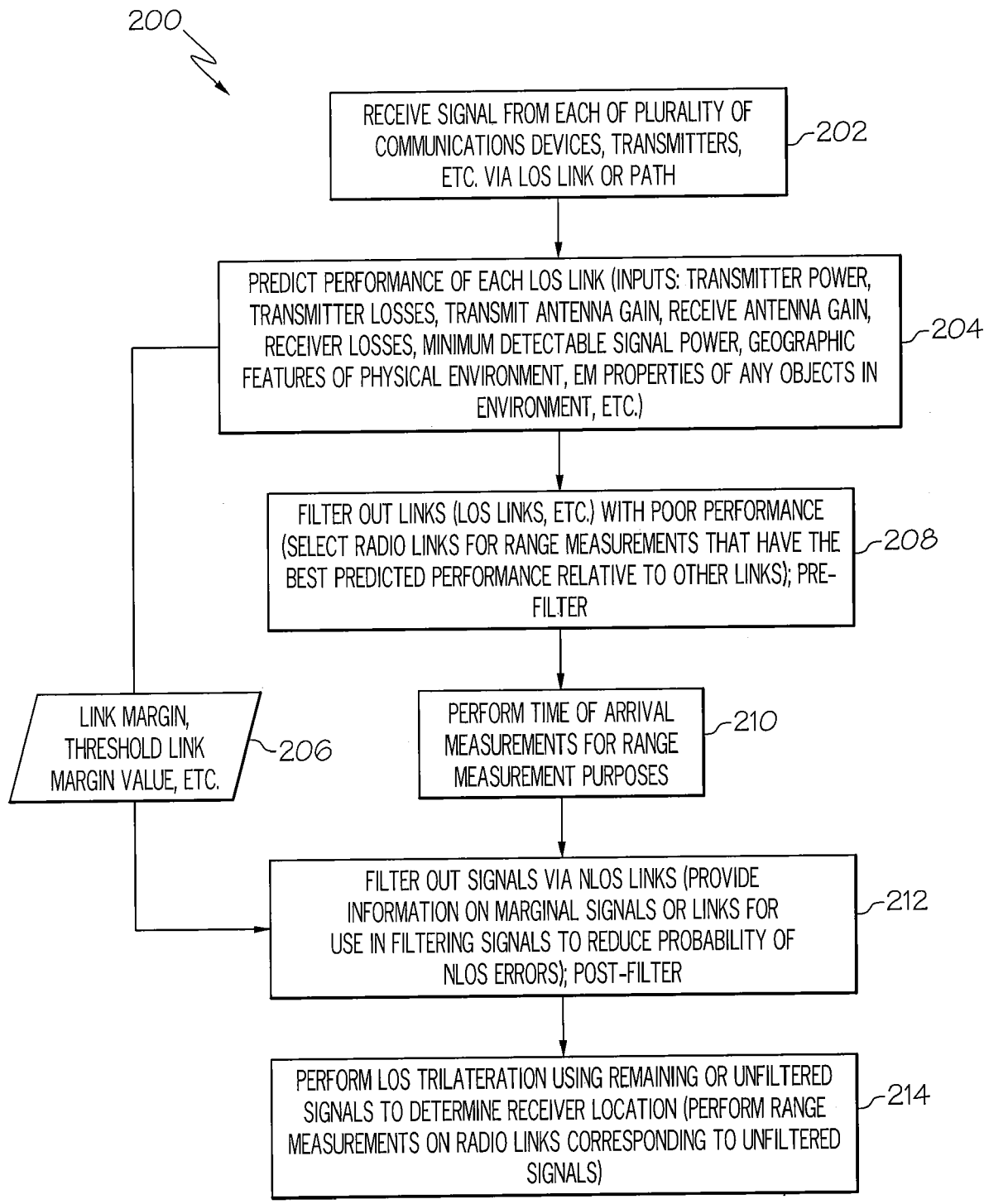
FIG. 2 is a flow chart of an example of a method for trilateration using LOS link performance prediction and pre-measurement LOS path filtering in accordance with an embodiment of the present invention.
Figure 3:
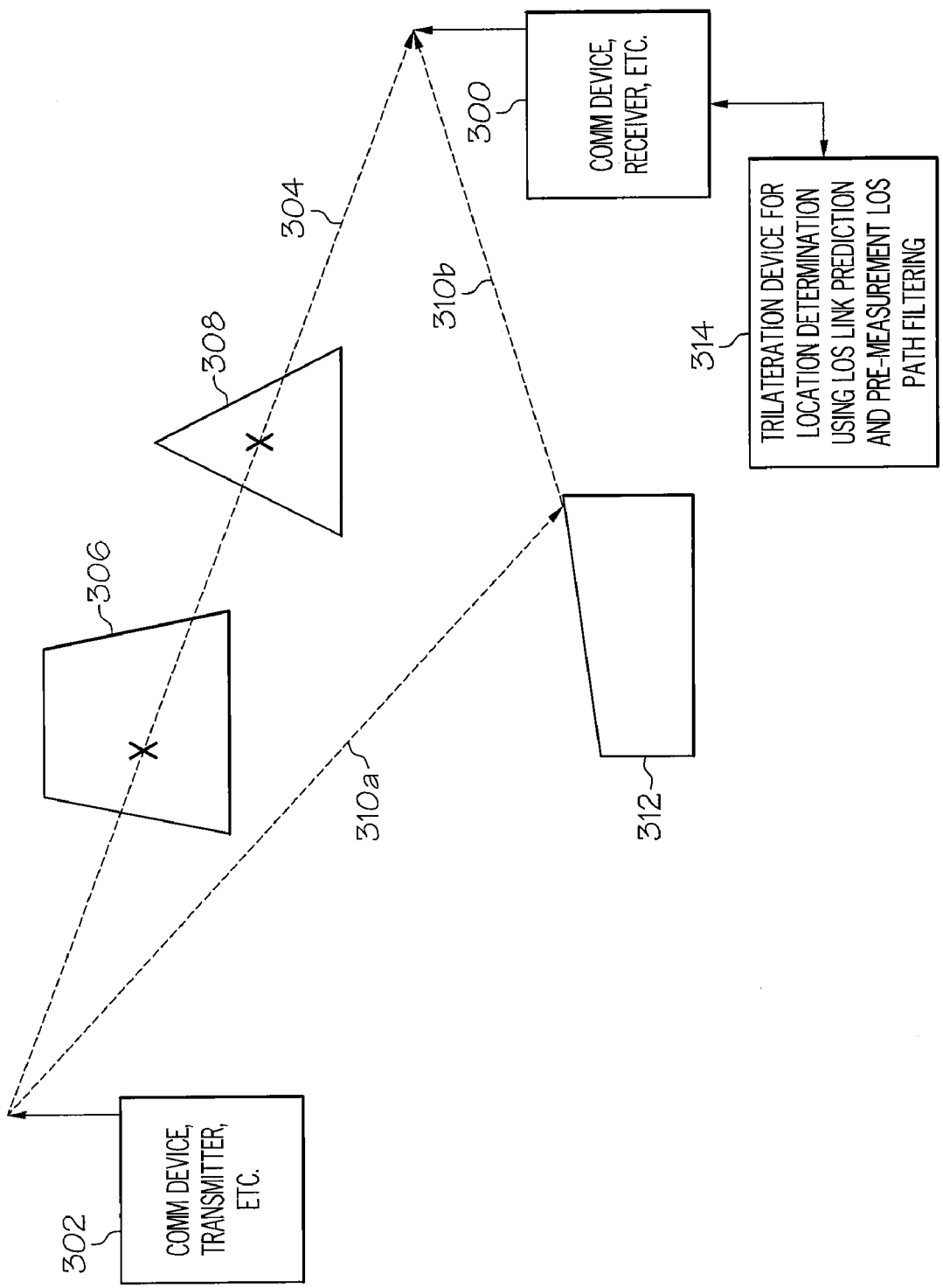
FIG. 3 is an illustration of an example of determining a location of a device or receiver using trilateration and LOS link performance prediction and pre-measurement LOS path filtering in accordance with an embodiment of the present invention.

FIG. 2 is a flow chart of an example of a method 200 for trilateration using LOS link performance prediction and pre-measurement LOS path filtering in accordance with an embodiment of the present invention. In block or module 202, a signal may be received from each of a plurality of communications devices. The communications devices may each be a transmitter, transmitter associated with a device being located or any device capable of transmitting a signal. The signals may be received via a line of sight (LOS) link or path. Referring also to FIG. 3, FIG. 3 is an illustration of an example of determining a location of a device 300 or receiver using trilateration and LOS link performance prediction and pre-measurement LOS path filtering in accordance with an embodiment of the present invention. The device 300 may be a vehicle including a communications device, receiver or the like. The vehicle may be a terrestrial vehicle, aerospace vehicle or watercraft. A device 302, communications device or transmitter or similar device may transmit a signal via a LOS path or path 304. The vehicle may be a terrestrial vehicle, aerospace vehicle or watercraft. The device 302 may also be a vehicle including a communications device, transmitter or the like. The LOS path 304 may include attenuating objects, such as objects 306 and 308 that may impact the performance of the LOS path or link 304. An attenuating object may be any object that may be in a transmission path or link and may intersect an RF signal being transmitted via the path or link and that may cause some attenuation or loss of power of the signal or otherwise impact transmission performance of the link or path. The device 300 may also receive signals via a non-line of sight (NLOS) path or link 310. The signal may be scattered or reflected by a scattering object 312 that may also be an attenuating object.

In block or module 204, performance of each LOS path may be predicted. A link margin 206, probability of detection or other measure of performance or transmission performance may result or be output from block or module 204. An example of a method 400 for predicting the performance of a LOS path will be described in more detail with reference to FIG. 4. Inputs for predicting the performance of a LOS path in block 204 may include transmitter power, transmitter losses, transmit power antenna gain, receive antenna gain, receiver losses, minimum detectable signal power, geographic features of the physical environment around the transmitters and receiver or device being located, electromagnetic properties of any objects, such as attenuating objects in the environment, or other parameters that may effect LOS transmission of signals.

In block or module 208, links, such as LOS links, or signals with poor performance may be filtered out. LOS radio links or signals that have the best performance relative to other LOS links or signals may be selected for range measurements. The block or module 208 may define a pre-filter to filter out poor performing LOS links or signals and/or associated transmitters with a performance parameter, such as link margin, probability of detection, or other performance parameter, below a predetermined threshold value before performing time of arrival measurements or range measurements. An example of a method 500 for filtering links that may be used for block or module 206 will be described in more detail with reference to FIG. 5.

In block or module 210, a time of arrival for the signals from the transmitters or communications devices may be measured for purposes of performing or determining range measurements.

In block or module 212, signals via a NLOS link may be filtered out. Information on marginal signals or links may be provided for use in filtering signals to reduce the probability of NLOS errors. For example, link margin information 206, threshold link margin value, probability of detection or other link performance information may be provided to block or module 212 for purposes of filtering out other signals, such as NLOS signals. The block or module 212 may define a post-filter for filtering other signals or links after performing time of arrival or range measurements.

In block 214 LOS trilateration may be performed using the remaining or unfiltered signals or paths to substantially determine or estimate the location of the receiver. Range measurements may be performed on radio links corresponding to unfiltered signals. Accordingly, a location of a device or receiver may be substantially determined or estimated by predicting the performance of each LOS link or signal (LOS link prediction) in block 204; and filtering out links or signals with poor performance (pre-measurement filtering) in block 208 before time of arrival and range measurements in block 210. The embodiment of the present invention illustrated in FIG. 2 may also include filtering out signals in block 212 after time of arrival measurements or range measurements (post-filtering). The post-filtering may also involve using information 206 on marginal signals or links for improved accuracy and to reduce the probability of errors, such as using a NLOS signal for LOS range measurements or other errors.

A trilateration device 314 may be associated with the device 300 or may be integrated into the device 300 or receiver. The method 200 may be embodied or performed by the trilateration device 314. Accordingly, the trilateration device 314 may be used for location determination of the device 300 using LOS link prediction and pre-measurement LOS path filtering and post-measurement filtering using predicted performance information.

Figure 4A:
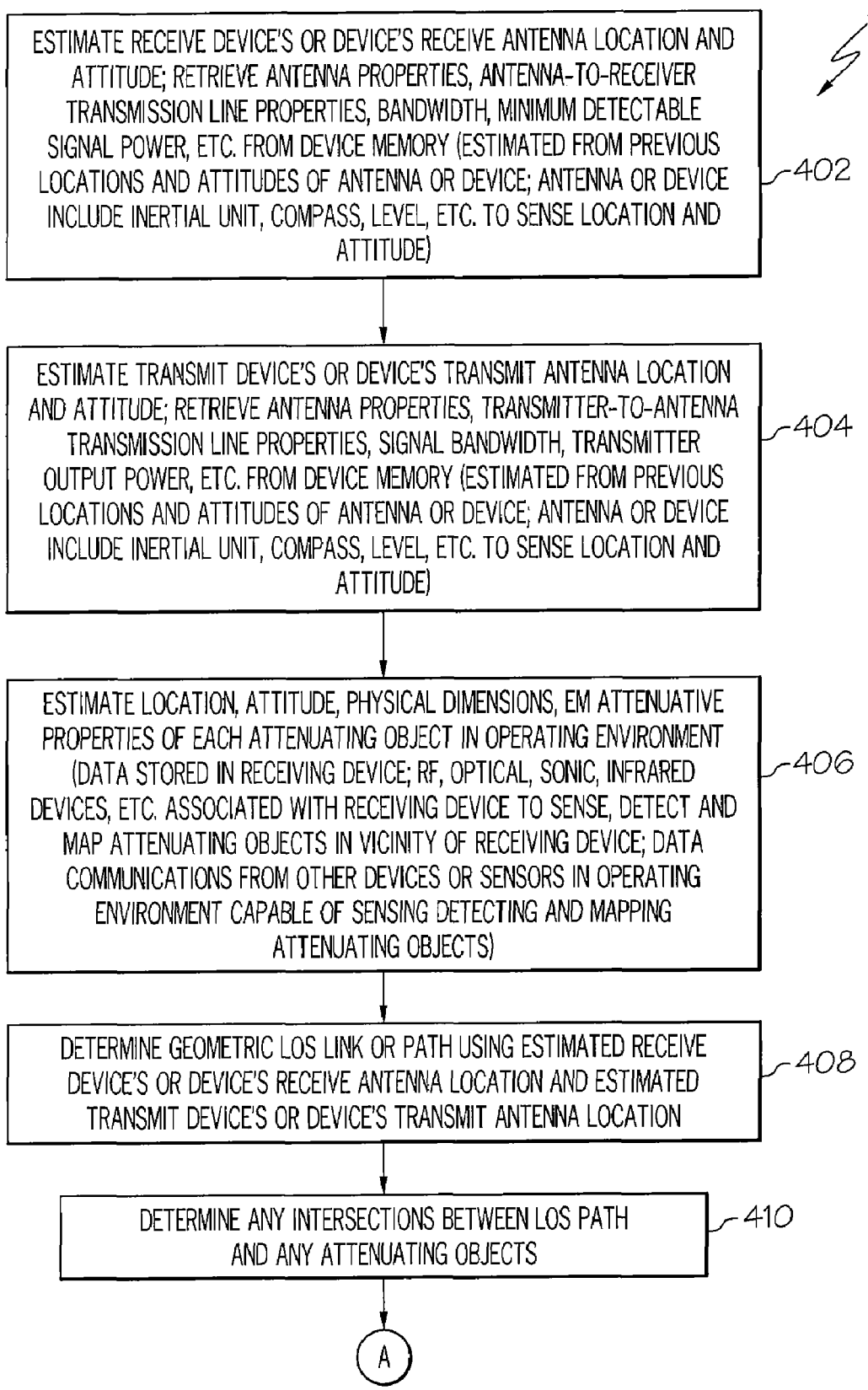
FIGS. 4A and 4B (collectively FIG. 4) are a flow chart of an example of a method for predicting performance of a LOS link or path in accordance with an embodiment of the present invention.
Figure 4B:
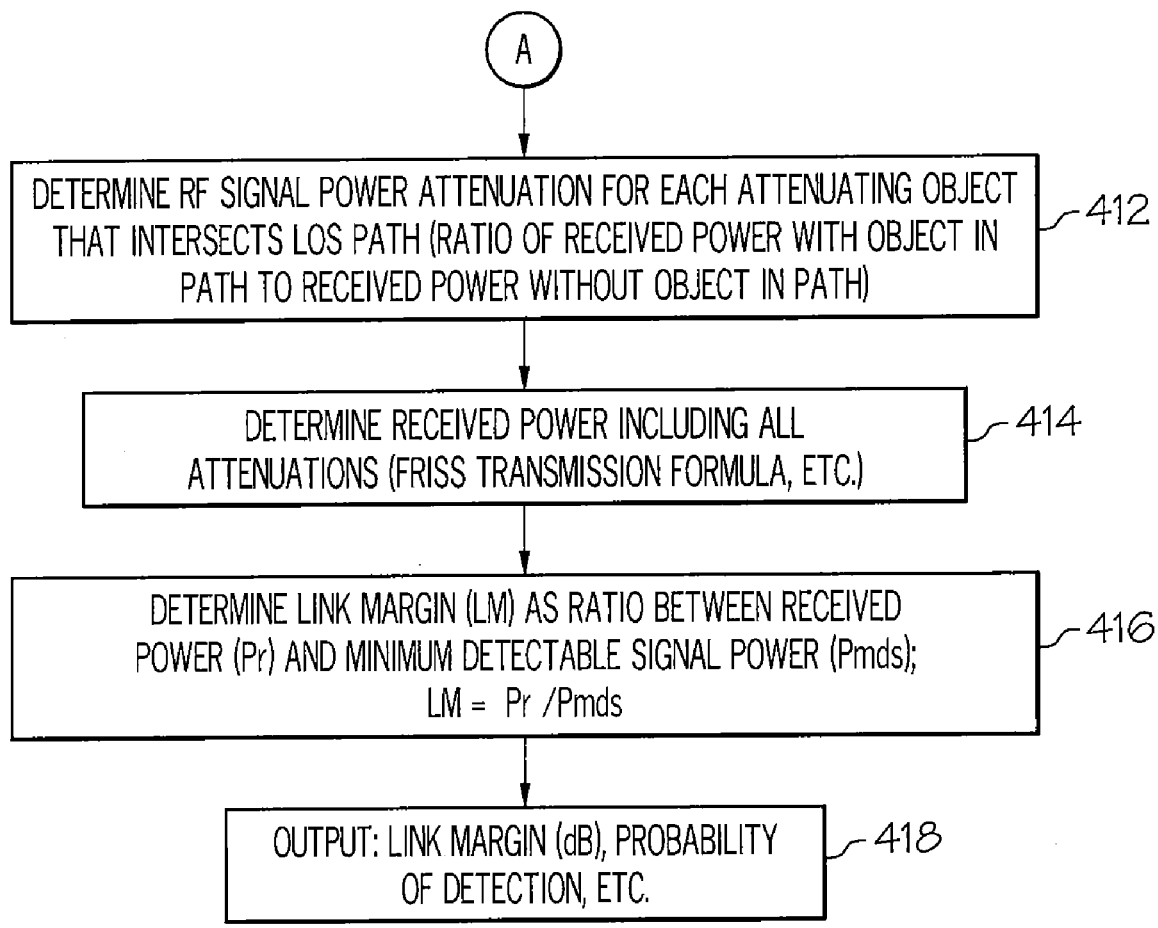

FIGS. 4A and 4B (collectively FIG. 4) are a flow chart of an example of a method 400 for predicting performance of a LOS link or path in accordance with an embodiment of the present invention. The method 400 may be used for the block or module 204 in the method 200 of FIG. 2. In block or module 402, a receive device or the device's receive antenna location and attitude or orientation may be estimated. Estimating the receive antenna's location and attitude may include retrieving a set of parameters from a memory of the device or some other data source that may be used in determining a location and attitude of the receive device or device's receive antenna. The set of parameters may include antenna properties, antenna-to-receiver transmission line properties, signal bandwidth, minimum detectable signal power or other parameters.

The location and attitude may be estimated from previous locations and attitudes of the antenna or device. The antenna assembly or device may also include an inertial unit, compass, level or similar apparatus to sense location and attitude.

In block or module 404, a transmit device's or transmit device's antenna location and attitude may be estimated. Estimating the location and attitude of the transmit device or transmit device's antenna may involve retrieving a set of parameters from a memory of the device or other data source. The set of parameters may include antenna properties, transmitter-to-antenna transmission line properties, signal bandwidth, transmitter output power or other parameters.

The location and attitude or orientation of the transmit device or transmit device's antenna may be estimated from previous locations or attitudes of the device or antenna. The transmit device may also include apparatus to sense a location and attitude, such as an inertial unit, a compass, a level or similar means to sense location and attitude or orientation.

In block or module 406, characteristics or properties of any attenuating objects in the operating environment or that may intersect a transmission path between a transmitter and the receiver may be estimated. The characteristic or properties may include location, attitude, physical dimensions, electromagnetic (EM) attenuative properties, or other characteristics, properties or parameters. Data related to any attenuating objects may be stored in the receiving device. Data may be determined from a survey of the operating environment.

The receiving device may also include apparatus to sense, detect and map objects in the operating environment. Examples of such apparatus may include RF devices, optical devices (cameras, etc.), sonic devices, infrared devices or the like. The devices may transmit radio, optical, sound or infrared signals and detect any return signals from any attenuating object in the operating environment or that may intersect a transmission path or link.

The receive device may also receive information or data from other devices or sensors in the operating environment capable of sensing, detecting and mapping any attenuating objects.

In block or module 408, a geometric LOS link or path may be determined using the estimated location and attitude of the receive device or receive device antenna and the transmit device or transmit device antenna. In block or module 410, any intersections between the LOS path and attenuating objects may be determined.

In block or module 412, a RF signal power attenuation may be determined for each attenuating object that intersects the LOS path. The RF signal power attenuation may include a ratio of received power with the object in the path to the received power without the object in the path.

In block or module 414, a received power at the receiver including all attenuations may be determined. In one embodiment of the present invention, the received power may be determined using the Friss transmission formula or by other means. The Friss transmission formula may be defined by equation 1:

$$P_r = P_t * G_t * L_t * G_r * L_r * L_{path} * (\lambda/4\pi)^2 * r^{-n} \quad \text{(Eq. 1)}$$

Where
$P_r$ = received power (Watts)
$G_t$ = gain of the transmit antenna in direction of LOS path
$L_t$ = power attenuation in transmission line between transmitter and transmit antenna
$G_r$ = gain of the receive antenna in direction of LOS path
$L_r$ = power attenuation in transmission line between transmitter and transmit antenna
$\lambda$ = wavelength of radio wave (meters)
r = distance between transmit and receive antennas (meters)
n = propagation exponent constant, typically n=2 for free space
$L_{path}$ = product of all power attenuation from attenuating objects along LOS path In block or module 416, a link margin (LM) may be determined as the ratio between received power ($P_r$) and minimum detectable power ($P_{mds}$):

$$LM = P_r/P_{mds} \quad \text{(Eq. 2)}$$

In block or module 418, the link margin in decibels (dB), a probability of detection or any type of performance parameter may be outputted or presented to a user via a display or other output means. The method 400 may be used to determine the performance for each LOS path or link.

Figure 5:
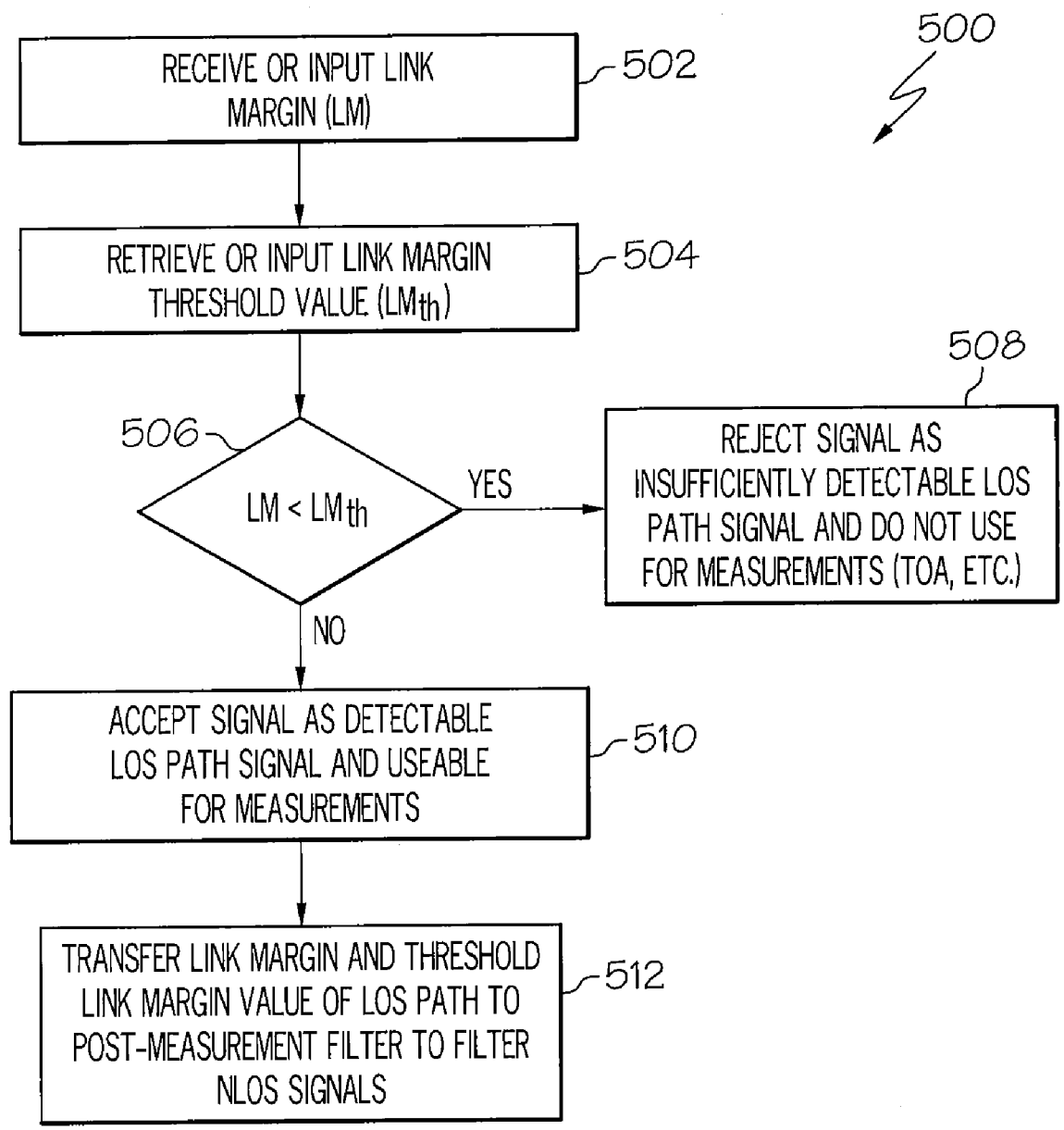
FIG. 5 is a flow chart of an example of a method for pre-measurement LOS path filtering to filter out poor performance LOS links prior to time of arrival measurements of signals in accordance with an embodiment of the present invention.

FIG. 5 is a flow chart of an example of a method 500 for pre-measurement LOS path filtering to filter out poor performance LOS links or signals prior to time of arrival measurements or range measurements of signals in accordance with an embodiment of the present invention. The method 500 may be embodied in or used for the block or module 208 of the method 200 of FIG. 2.

In block or module 502, a link margin (LM) may be received or inputted. The link margin may be determined by method 400 (FIG. 4) or from Block 204 in FIG. 2. In block 504, a link margin threshold value ($LM_{th}$) may be retrieved from a memory of other data source or inputted by a user. In block 506, a determination may be made whether the link margin is less than the link margin threshold value. If the link margin is less than the link margin threshold value, the method 500 may advance to block 508. In block or module 508, the signal associated with the link or path may be rejected as being an insufficiently detectable LOS path signal and the signal will not be used for measurements, such as time of arrival (TOA), range measurements or similar measurements for locating the receiver or receive device.

If the link margin is not less than the link margin threshold value, the method 500 may advance to block 510. In block 510, the signal and associated link may be accepted as a detectable LOS path and the signal or signals received may be used for measurement purposes.

In block 512, the link margin, threshold link margin value and/or other performance information (data block 206 in FIG. 2) may be passed or transferred to a post-filter, such as block or module 212 in FIG. 2, to filter other signals and associated paths, such as NLOS signals or paths.

Figure 6:
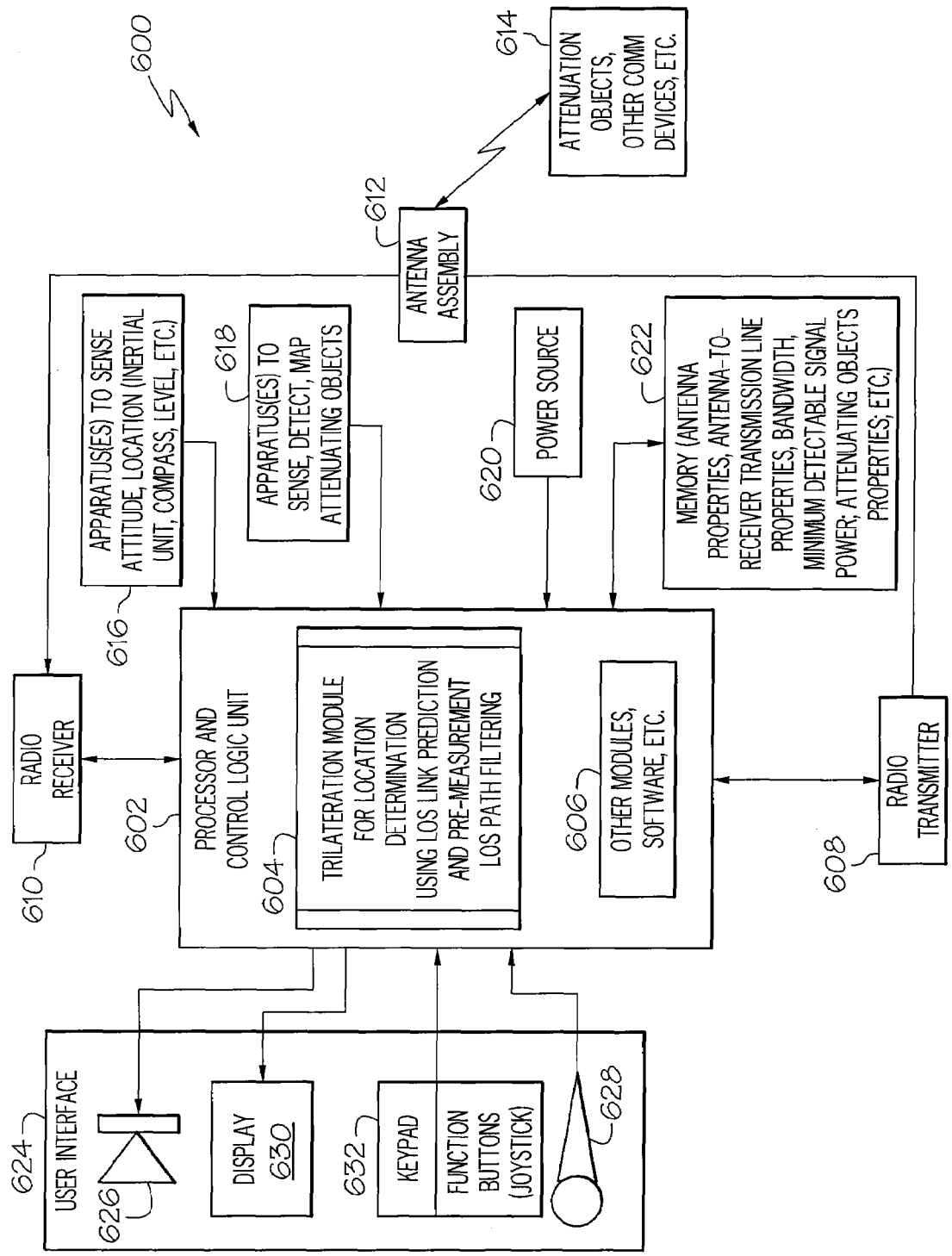
FIG. 6 is a block diagram of an example of a device capable of determining location using trilateration and LOS link performance prediction and pre-measurement LOS path filtering in accordance with an embodiment of the present invention.

FIG. 6 is a block diagram of an example of a device 600 capable of determining location using trilateration and LOS link performance prediction and pre-measurement LOS path filtering in accordance with an embodiment of the present invention. The method 200 of FIG. 2, method 400 of FIG. 4 and method 500 of FIG. 5 may be embodied in or performed by the device 600. The device 600 may include a processor and control logic unit 602 or the like to control operation of the device 600 and to perform predetermined functions, such as determining or estimating location of the device 600.

A trilateration module 604 may be operable on the processor 602 for location determination. The trilateration module 604 may determine or estimate a location of the device 600 using LOS link prediction and pre-measurement LOS path filtering. The methods 200, 400 and 500 of FIGS. 2, 4 and 5, respectively, may be embodied in the trilateration module 604.

Other modules 606, software or the like may be operable on the processor and control logic unit 602 to perform other operations, such as receiving and transmitting signals. For this purpose, the device 600 may include a radio transmitter 608 and a radio receiver 610. The transmitter 608 and receiver 610 may respectively transmit and receive signals via an antenna assembly 612. Accordingly, signals may be transmitted and received from other communications devices 614 or the like. The transmitted and received signals may intersect attenuation objects similar to that previously described with respect to FIG. 3.

The device 600 may also include one or more apparatus 616 to sense attitude and location of the device 600 or antenna assembly 612. As previously discussed, examples of the apparatus 616 to sense attitude and location of the device 600 may include an inertial unit, a compass, a level or other apparatus.

The device 600 may also include one or more apparatus 618 to sense, detect and map any attenuating objects in the operating environment or proximate to the device 600 that may intersect any signals being received by the device 600. Examples of the apparatus 618 to sense, detect, and map any attenuating objects may include RF devices, optical devices, sonic devices, infrared devices or similar devices to sense, detect and map any attenuating devices proximate the device 600. The apparatus 616 and 618 may be formed or provided as components of the device 600 or may be separate units associated with the device 600.

The device 600 may also include a power source 620. The power source 620 may be battery or other energy storage device to permit mobile operation.

The device 600 may further include a memory 622 for storing data useable by the trilateration module 604 for location determination. The memory 622 may store data or information, such as antenna properties, antenna-to-receiver transmission line properties, signal bandwidth, minimum detectable signal power, attenuating object properties and other parameters or properties.

The device 600 may also include a user interface 624 to permit a user to interact with and control the device 600. The user interface 624 may include a speaker 626 to provide audible signals, such as voice communications or other audible signals, and a microphone 628 to receive voice signals from a user or to receive other audible signals. The user interface 624 may also include a display 630 for presenting information to a user, such as location information, link performance information (link margin, probability of detection, etc.) and other information related to operation of the device 600.

The user interface 624 may further include a keypad 632, keyboard, function buttons, joy stick or other interface means to permit entry of commands for controlling operation of the device 600 or for performing selected functions, such as location determination, communications or other functions.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for trilateration, comprising:
receiving a signal via each of a plurality of LOS paths;
predicting a link margin of each LOS path;
filtering out signals received via LOS paths with predicted link margins below a predetermined threshold value by rejecting any signal with an associated predicted link margin less than a predetermined threshold link margin as an insufficiently detectable LOS path signal and to not use the signal for a time of arrival measurement; and
performing trilateration using signals via only LOS paths that remain after filtering out signals received via LOS paths with predicted link margins below the predetermined threshold value to substantially determine a location of a device.

2. The method of claim 1, further comprising measuring a time of arrival for each signal.

3. The method of claim 2, wherein filtering out signals received via LOS paths with predicted link margins below the predetermined threshold value is performed before measuring a time of arrival of each signal.

4. The method of claim 1, further comprising filtering out signals received via a NLOS path.

5. The method of claim 1, further comprising:
measuring a time of arrival for each signal, wherein filtering out signals received via LOS paths with predicted link margins below a predetermined threshold value is performed before measuring a time of arrival of each signal; and
filtering out any other signals after performing time of arrival measurement.

6. The method of claim 5, further comprising providing predicted path performance for use in filtering out any other signals after performing time of arrival measurements.

7. The method of claim 1, further comprising:
determining any intersections between each LOS path and any attenuating objects;
determining a RF signal power attenuation for each attenuating object for use in
predicting the link margin for each LOS path.

8. The method of claim 1, further comprising estimating a receive antenna location and attitude.

9. The method of claim 1, further comprising estimating a transmit antenna location and attitude.

10. The method of claim 1, further comprising estimating a group of characteristics of any signal attenuating objects in an operating environment of the device, wherein the group of characteristics comprise a location in the operating environment, physical dimensions, and electromagnetic attenuative properties.

11. The method of claim 1, further comprising accepting any signals received via a LOS path as being useable for performing trilateration in response to the predicted link margin of the LOS path being greater than or equal to a predetermined link margin threshold value.

12. A method for trilateration, comprising:
predicting a radio link margin for each LOS radio link between a receiver and each of a plurality of transmitters;
selecting only LOS radio links for range measurements that have a better predicted link margin relative to other radio links by rejecting any radio links with a link margin below a predetermined threshold link margin, wherein the predicted link margin is a ratio between a predicted receive power of a signal via the LOS radio link and a minimum detectable signal power and includes taking into account any attenuating objects in the LOS radio link between the receiver and each of the plurality of transmitters; and
determining the receiver's location using the selected radio links for range measurements.

13. The method of claim 12, further comprising determining a probability of detecting signals for each LOS radio link.

14. The method of claim 12, further comprising providing information on any marginal signals or radio links for use in filtering signals to reduce a probability of NLOS errors.

15. The method of claim 12, further comprising filtering any LOS radio links with the predicted link margin being below a predetermined link margin threshold value.

16. The method of claim 12, wherein taking into account any attenuating objects comprises:
   determining any intersections between each LOS radio link and any attenuating objects; and
   determining a signal power attenuation for each attenuating object.

17. The method of claim 12, further comprising ensuring that a minimum of three detectable signal sources are selectable for location determination.

18. The method of claim 12, further comprising performing pre-measurement and post-measurement filtering.

19. A device for trilateration, comprising:
   a receiver to receive a signal from each of a plurality of transmitters over a respective LOS radio path;
   a module to predict a link margin of each LOS radio path;
   a filtering device to filter out signals received via LOS radio paths with a corresponding predicted link margin below a predetermined threshold link margin value by rejecting any signal with the corresponding predicted link margin less than the predetermined threshold link margin value as an insufficiently detectable LOS path signal and to not use the signal for a time of arrival measurement;
   a module to determine a location of the receiver using signals that remain after filtering out signals received via LOS radio paths with a corresponding predicted link margin below the predetermined threshold link margin value; and
   an output device to present the location of the receiver or a device associated with the receiver.

20. The device of claim 19, further comprising a device to sense an attitude and location of the device or receiver.

21. The device of claim 19, further comprising at least one device to sense, detect and map any attenuating objects in the respective radio paths.

22. The device of claim 19, further comprising a memory, wherein the memory comprises at least one of antenna properties for an antenna associated with the receiver, antenna-to-receiver transmission line properties, a receivable bandwidth parameter, a minimum detectable signal power parameter, and properties associated with any attenuating objects in the respective radio paths.

23. The device of claim 19, the filter device filters out signals before performing any measurements for determining the location of the receiver.

24. A device for trilateration, comprising:
   means for predicting a radio link performance for each LOS radio link between a receiver and each of a plurality of transmitters;
   means for selecting LOS radio links for range measurements that have a higher predicted link margin relative to other radio links by rejecting any radio links with an associated predicted link margin below a predetermined threshold link margin, wherein the predicted link margin is a ratio between a calculated receive power of a signal via the LOS radio link and a minimum detectable signal power; and
   means for determining the receiver's location using the selected LOS radio links for range measurements.

25. The device of claim 24, further comprising a pre-filter to filter any LOS radio links having the associated predicted link margin below the predetermined threshold link margin before any measurements for determining the receiver's location.

26. The device of claim 24, further comprising a post-filter to reduce NLOS errors after any measurements for determining the receiver's location.

27. The device of claim 26, further comprising means for providing radio link performance information to the post-filter.

28. The device of claim 24, wherein the device is used in association with a vehicle to find a location of the vehicle.

29. A computer program product for trilateration, the computer program product comprising:
   a computer usable medium having computer usable program code embodied therein, the computer usable medium comprising:
      computer usable program code configured to predict a radio link margin for each LOS radio link between a receiver and each of a plurality of transmitters;
      computer usable program code configured to select LOS radio links for range measurements that have the best predicted link margin relative to other LOS radio links by rejecting any LOS radio links with an associated predicted link margin below a predetermined threshold link margin, wherein the predicted link margin is a ratio between a calculated receive power of a signal via the LOS radio link and a minimum detectable signal power; and
      computer usable program code configured to determine the receiver's location using the selected LOS radio links for range measurements.

30. The computer program product of claim 29, further comprising computer usable program code configured to filter any LOS radio links with the associated predicted link margin below the predetermined threshold link margin.

31. The computer program product of claim 29, further comprising computer usable program code configured to perform pre-measurement and post-measurement filtering.

32. A vehicle, comprising:
   a device for locating the vehicle, wherein the device includes:
      means for predicting a radio link margin for each LOS radio link between a receiver and each of a plurality of transmitters;
      means for selecting LOS radio links for range measurements that have the best predicted radio link margin relative to other LOS radio links by rejecting any LOS radio links with an associated predicted link margin below a predetermined threshold link margin, wherein the predicted link margin is a ratio between a calculated receive power of a signal via the LOS radio link and a minimum detectable signal power; and
      means for determining the vehicle's location using the selected LOS radio links for range measurements.

33. The vehicle of claim 32, further comprising a pre-filter to filter any LOS radio links having the associated predicted link margin below the predetermined threshold link margin before any measurements for determining the receiver's location.

34. The vehicle of claim 32, further comprising a post-filter to reduce NLOS errors after any measurements for determining the receiver's location.

* * * * *